United States Patent [19]

Sim

[11] Patent Number: 4,796,158
[45] Date of Patent: Jan. 3, 1989

[54] APPARATUS FOR HOLDING ELECTRICAL OR ELECTRONIC COMPONENTS DURING THE APPLICATION OF SOLDER

[75] Inventor: Ah T. Sim, Singapore, Singapore
[73] Assignee: Sun Industrial Coatings Private Limited, Jurong, Singapore
[21] Appl. No.: 72,036
[22] Filed: Jul. 10, 1987
[30] Foreign Application Priority Data
  Jul. 11, 1986 [GB] United Kingdom ............. 8616938
[51] Int. Cl.⁴ .............................................. H05K 7/02
[52] U.S. Cl. ................................ 361/417; 118/503; 206/331; 228/40
[58] Field of Search .......... 118/500, 503, 425; 228/40, 43; 269/903; 361/417, 419–420, 429, 427; 206/328, 331

[56] References Cited
U.S. PATENT DOCUMENTS
4,580,523  4/1986  Sunage et al. ................. 118/503
4,677,937  7/1987  Tee ................................ 118/503
4,700,935 10/1987  Winslow et al. ............... 269/903

Primary Examiner—A. D. Pellinen
Assistant Examiner—Gregory D. Thompson
Attorney, Agent, or Firm—Bacon & Thomas

[57] ABSTRACT

A carrier for holding SOIC packages during the application of solder to their leads, the carrier including a frame provided with an end plate (17) with mounting lugs (20). On each lug (20) is mounted an upper U-shaped member (1) and a lower U-shaped elongate member (8) with the respective legs (3) and (10) of the members projecting downwardly. The legs (10) are disposed within the legs (3) but extend further and terminate at outwardly turned ends (11). Adjacent assemblies of the members (1) and (8) define a track (T) therebetween for a line of SOIC packages (24) whose leads (26) rest on end portions (11), and which are restricted against upward movement by the ends (4) of legs (3).

5 Claims, 3 Drawing Sheets

APPARATUS FOR HOLDING ELECTRICAL OR ELECTRONIC COMPONENTS DURING THE APPLICATION OF SOLDER

BACKGROUND OF THE INVENTION

1. Field of the Invention

This invention relates to apparatus for holding electrical or electronic components, particularly during the application of solder. The invention is particularly concerned with the holding of integrated circit packages while their leads are being coated with solder, for example in, wave soldering apparatus. Such a coating is applied before the packages are inserted into circuit boards or suitable holders and, if necessary, soldered in place.

2. Description of the Prior Art

In the U.S. Pat. No. 4,677,937 there is disclosed a carrier for a plurality of electrical or electronic components, particularly for use as outlined above, that includes a frame in which there are provided a plurality of parallel tracks for receiving the components. The tracks are formed by a plurality of parallel, laterally spaced, axially extending upper support members, each of which defines a pair of parallel axially extending upper rails having downwardly facing portions. The tracks also include a plurality of parallel, laterally spaced, axially extending lower support members aligned with the upper support members, each of the lower support members defining a pair of parallel, axially extending lower rails having upwardly facing portions. Each track is defined by four rails and is situated between two adjacent upper support members and their aligned lower support members.

Such a carrier has been found to be extremely effective, providing easy access for solder to the components, easy loading and unloading of the components, and the ability to withstand the temperature changes encountered during use.

SUMMARY OF THE INVENTION

The present invention relates to a modification of such an arrangement which has been designed particularly, but not exclusively, for handling smaller sizes of integrated circuit packages, such as SOIC (Small Outline Integrated Circuit) packs which are usually surface mounted on boards.

In accordance with one aspect of the carrier of the invention, each upper support member is of substantially "U"-section with its legs directed downwardly, and each lower support member is also of substantially "U"-section with its legs projecting downwardly and beyond the ends of the legs of its aligned upper support member but being spaced inwardly thereof. The lower support member have end regions of its legs directed outwardly so as to provide portions which face generally upwardly.

With such an arrangement, the four rails of each track, within which the components are to be received, are defined by the legs of two adjacent upper "U"-shaped support members and by the outwardly directed end regions of the legs of two adjacent lower "U"-shaped support members. It will be appreciated that viewed from the center of the track, these end regions are directed inwardly.

Thus, the components will run along the upwardly facing portions of the legs of the lower support members and will be restricted in terms of upward movement by the downwardly directed legs of the upper support member. The legs of the lower support members will restrict lateral movement of the components.

In such a system, the components will generally rest on their leads which will engage the upwardly facing portions of the legs of the lower support members. In the case of SOIC's, they will rest on laterally directed portions of the leads since the components are designed for surface mounting on boards.

Such an arrangement differs from that shown in the U.S. Pat. No. 4,677,937, where the leads are free from the tracks. However, access to solder is still adequate since the components will float up when the carrier is dipped in solder, so that the leads will be adequately exposed.

With the arrangement described, it is not necessary for the upper and lower support members to be spaced vertically by any great distance, since they are both downwardly facing "U"-shaped members, one within the other. Indeed they can be positioned with one immediately below the other, and preferably even in contact therewith. This provides a further advantage since they can be mounted together on a single mounting, i.e. with a single lug engaging in a slot in each of them. As is disclosed in the U.S. Pat. No. 4,677,937 it is desirable to mount the support members by means of lug/slot arrangements to allow for thermal expansion. It might even be possible, e.g. by aperturing the upper sppport member, to mount the lower support member so that it projects through the upper support member, although this will involve certain modifications at the ends where the support members are located.

As is further disclosed in the U.S. Pat. No. 4,677,937 the support members may be provided with apertures along their length to reduce the amount of material. In one preferred arrangement, either or each support member may now have a slot along its entire length. Cross-members may be provided at intervals to reinforce the support member and e.g. resist thermal deformation. If desired, however, the members could be provided without any such slot.

The general layout of the apparatus and the manner in which it is used be similar to those disclosed in the U.S. Pat. No. 4,677,937.

BRIEF DESCRIPTION OF THE PRIOR ART

An embodiment of apparatus exemplifying some of the above and other broad aspects will now be descrived by way of example and with reference to the accompanying drawings, in which.

DETAILED DESCRIPTION OF THE PREFERRED EMBODIMENT

Figure 1:
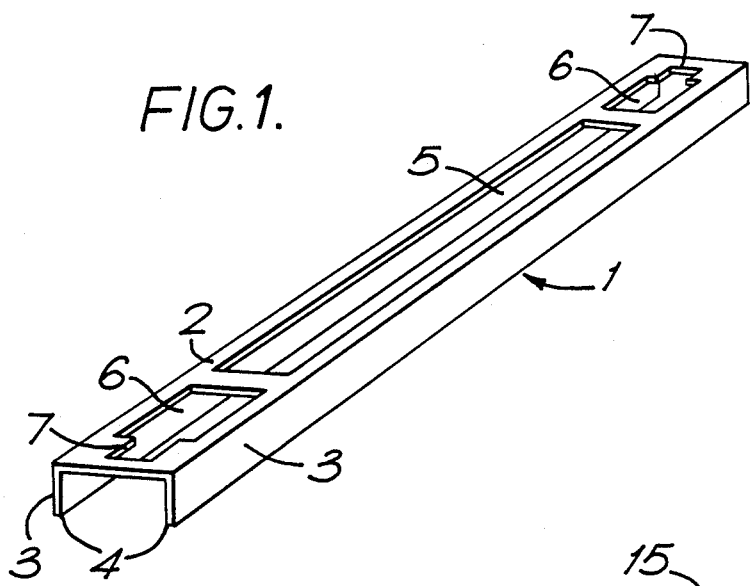
FIG. 1 is a perspective view of an upper support member.

Referring now in detail to the drawings, in FIG. 1 there is shown an elongate upper support member 1 formed from a suitable material such as steel or titanium which will withstand the heat of immersion in solder without undue distortion and will be hard wearing. The member 1 is in the form of an elongate inverted "U" with an upper surface 2 and downwardly directed legs 3 having end portions 4. An elongate slot 5 is formed in the upper surface 2, to reduce the quantity of material. At either end of the member, in the upper surface 2, are formed apertures 6 having reduced size end portions 7. These apertures are used to locate the support member in the carrier.

Figure 2:
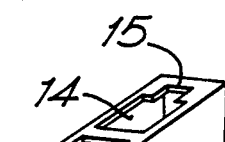
FIG. 2 is a perspective view of a lower support member.

In FIG. 2 there is shown an elongate lower member 8 likewise formed from a suitable material such as steel or titanium. The member 8 is in the form of an elongate inverted "U" with an upper surface 9 and downwardly directed legs 10 having end portions 11 which are bent outwardly so as to provide upwardly facing surfaces or portions 12. An elongate slot 13 is provided in the upper surface 9, as with the upper support member 1. Similarly apertures 14 are provided at either end of the surface 9, having reduced end portions 15 in the same manner as apertures 6 in the upper support member 1. The upper surface 9 is narrower than the surface 2 of the upper support member 1, and the legs 10 are longer than the legs 3.

Figure 3:
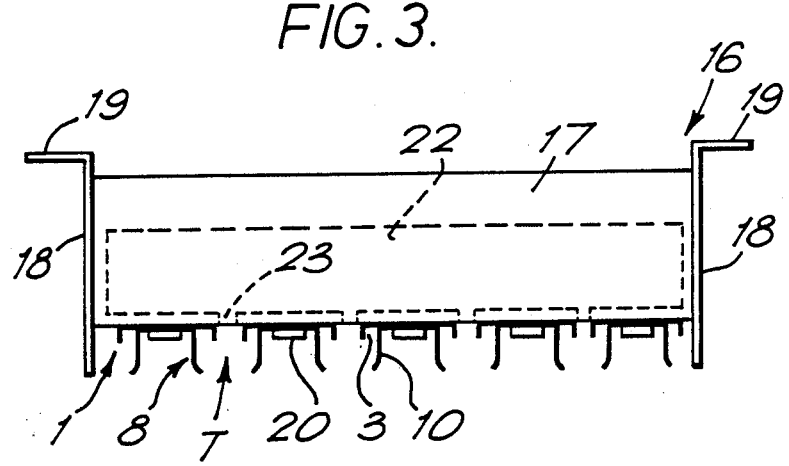
FIG. 3 is an end view of a carrier including the support members.

FIG. 3 shows an end view of an assembled carrier 16 using five upper members 1 and five lower members 8 so as to provide four tracks T. Although only one end is shown and descrbed, the other end is identical. The carrier has a frame defined by an end plate 17 and two side plates 18 with handle portions 19. On the end plate 17 are provided five mounting lugs 20. On each lug is mounted an upper support member 1 and, directly underneath and in contact with it, a lower support member 8 which is within the upper support member 1 but has its legs 10 projecting downwardly beyond the legs 3 of the upper support member 1. Each lug 20 is joined to the main body of the end plate 17 by a reduced size portion 21 which passes through the end portions 7 and 15 of the apertures 6 and 14 in the upper and lower support members 1 and 8, respectively. This is shown more clearly in FIGS. 4 and 5. Assembly is effected by passing the lug 20 through the larger portions of the apertures 6 and 14, and then sliding the support members. The tracks T are defined between each pair of aligned upper and lower support members 1 and 8.

A vertically movable gate 22 is provided on the end plate 17, having downwardly facing projections 23 which block the tracks T when the gate is lowered. With the gate raised, components can be inserted into the tracks T, and with it lowered the components will be kept in the tracks. The number of components accommodated will depend on their size and the length of the tracks T.

As mentioned above, the ends of the carrier are identical, so that components can be inserted into and removed from the tracks T at either end.

Figure 4:
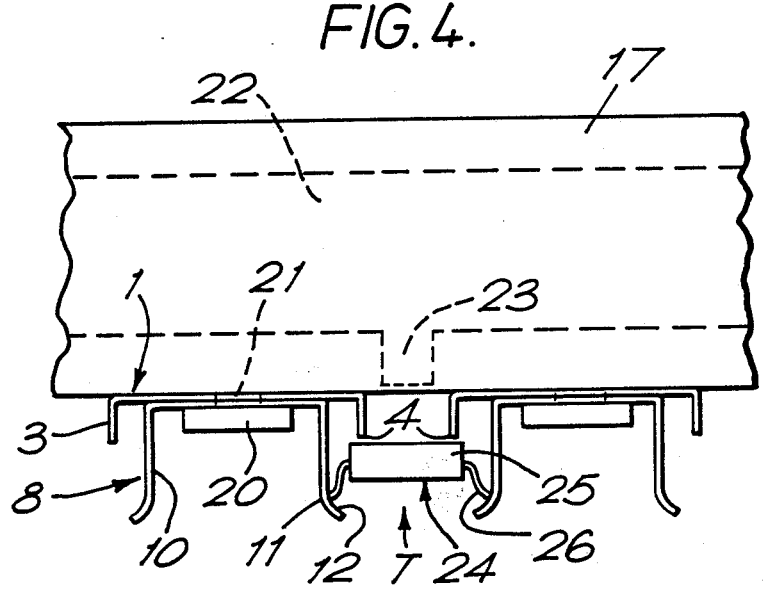
FIG. 4 is an enlarged end view of part of the carrier, showing a component in position.

As shown in the enlarged view of FIG. 4, an "SOIC" integrated circuit pack 24 has been inserted into one of the tracks T. The pack has a body 25 and leads 26 which flatten out so as to assist in surface mounting on a circuit board. In the track T, the SOIC pack rests on upwardly facing surfaces 12 by means of its leads 26. These surfaces, being angled to the vertical, also restrict sideways movement of the pack 25 as can the main portions of the legs 10. Upwards movement of the SOIC pack is restricted by the end portions 4 of the upper support member, although there is clearance. Thus, when the carrier is immersed in solder the component 25 can float up a short way so as to permit the leads 26 to lift free of surfaces 12 to ensure adequate access for the solder.

Figure 5:
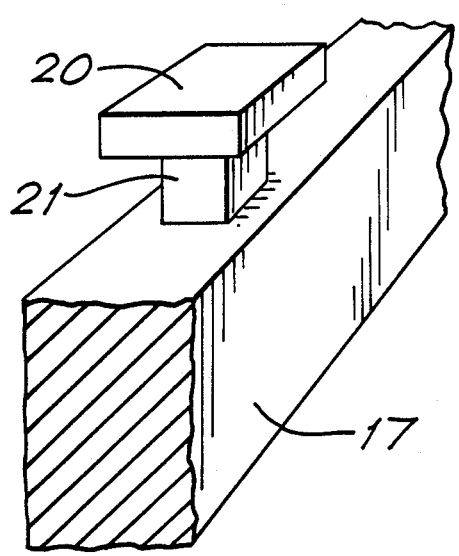
FIG. 5 is an enlarged view of part of an end of the carrier.

The construction of the lugs 20 is shown more clearly in FIG. 5 which illustrates how the rectangular lugs are joined to the main body of end plate 17 by the reduced portions 21.

It will be appreciated that many variations and modifications of the carrier and its components may be made while still retaining at least some of the novel concepts and structures disclosed herein and the corresponding advantages.

In use, the carriers will generally be handled e.g. as disclosed in the U.S. Pat. No. 4,677,937. However, it will be appreciated that the carrier may be handled differently and may also be used in fields other than soldering.

I claim:

1. A carrier (16) for a plurality of electrical or electronic components, comprising a frame in which is provided a plurality of parallel tracks (T) for receiving the components, the tracks (T) being formed by a plurality of parallel, laterally spaced, axially extending upper support members (1), each support member (1) being of substantially U-shaped configuration and defines a pair of parallel, axially extending upper legs (3), the upper legs (3) being directed downwardly and having downwardly facing portions (4), the tracks (T) being further formed by a plurality of parallel, laterally spaced, axially extending lower support members (8) aligned with the upper support members (1), each lower support member (8) being of substantially U-shaped configuration and defined a pair of parallel, axially extending lower legs (10), the lower legs (10) being directed downwardly and having end regions (11) directed outwardly to form generally upwardly racing portions (12), each track (T) being defined by four legs (3,10) and is situated between two adjacent upper support members (1) and their aligned lower support members (8), and wherein the legs (10) of each lower support member (8) project downwardly beyond the ends of the legs (3) of its aligned support member (1) and are spaced inwardly thereof.

2. The carrier of claim 1 wherein in each aligned pair of upper and lower support members (1,8), the members (1,8) are positioned adjacent each other in the vertical direction.

3. The carrier of claim 2, wherein each of the upper and lower support members (1,8) is provided with a mounting slot (6,14) and the members of each aligned pair are mounted by means of a lug (20) which engages in the slot (6,14) of the support members (1,8).

4. The carrier of claim 1, wherein each upper and lower support member is provided with a slot (5,13) along its length.

5. The carrier of claim 1, wherein the upper and lower support members (1,8) project downwardly from the frame.

* * * * *